United States Patent Office 3,152,908
Patented Oct. 13, 1964

3,152,908
PROCESS FOR PREPARING A GLAZED CHOCOLATE PRODUCT
Gerald M. Wiseman, Revere, Mass., and Vincent L. Mecagni, White Plains, N.Y., assignors to General Foods Corporation, White Plains, N.Y., a corporation of Delaware
No Drawing. Filed Aug. 20, 1962, Ser. No. 218,138
6 Claims. (Cl. 99—23)

The present invention relates to an improved process for placing a glaze or coating on edible products which are in the form of foods such as cholocate, confectioners' coatings, candies and the like. More particularly, the invention relates to a process for preparing a coated food where it is desired to have a high gloss on the surface of the product.

In the past, the usual technique for coating or glazing food products has been the use of a wet glaze wherein the coating material is dissolved in a solvent such as water or alcohol and thereafter contacted with the product to be coated. The glaze material is thereby distributed over the surface of the product and the carrier or solvent is thereafter evaporated from the surface by drying. The use of such a technique has required certain equipment; namely, batch type, rotating tanks, commonly known as "confectioners' pans" or dragée pans. In the case of chocolate products which are glazed, the processing done in the past has required about 6 to 26 hours. The usual procedure is to mix the product to be treated with a portion of the glaze in liquid form, and the product is then tumbled in the presence of glaze until dry. In the case of chocolate, air at a low temperature and relative humidity is blown across the chocolate particles. When dry the particles are mixed with additional amounts of glaze, tumbled and dried in the same manner as in the first instance. The glaze application and drying technique is repeated until the desired coating thickness is obtained. Such processing requires the use of highly skilled operators who must determine the precise moment when additional glaze should be added during processing. If the additional glaze is added too soon in such processing, the product becomes tacky and the particles form undesirable agglomerates. Furthermore, such techniques have always been restricted to batch type operations, severely limiting the capacity of other equipment due to the fact that a continuous process has heretofore been unavailable.

When one attempts to process chocolate "chips" by use of a wet glaze technique, a frequent problem is the formation of "doubles" which result when two chips adhere to each other in a back to back position on their flat surfaces. Chocolate chips are ordinarily prepared by extruding liquid chocolate onto a cold, smooth surface and air cooling the particles which produces a product which resembles a cone and has a smooth undersurface. Furthermore, certain products which are extremely sensitive to moisture cannot be processed by the wet glaze technique due to the presence of moisture in the wet glaze or the dissolving of the surface areas of the product being treated in the glaze carrier.

It is an object of the present invention to prepare a product which exists after processing in a highly glazed state and requires an extremely short processing time. Other objectives of the invention will be apparent from further reading of the specification.

It has now been discovered that a glazed product may be prepared by tumbling the product to be glazed for a period of time sufficient to permit frictional heat produced by the tumbling particles contacting each other to soften the surface of the particle sufficiently to permit smoothing of the surface by mechanical action, said frictional heat being sufficient to soften the particle surfaces, but insufficient to melt such surfaces.

In carrying out the present invention it has been found that it is possible to obtain a glossy surface on chocolate chips by tumbling the chips for a period of time sufficient to permit a smoothing of all the surface areas with a resulting increase in glossiness. Preferably, the chips which are to be glazed to obtain a glossy surface are tumbled in the presence of a dry glaze composition at a level of about 0.1–5.0% by weight of the chips and preferably 0.4–0.6% by weight of the chips when the chips count is 55 per ounce. When smaller chips having a larger surface area per unit weight are employed, a larger amount of dry glaze material may be used.

According to one embodiment of the present invention, commercial chocolate chips having a count of 55 per ounce and a fat content of about 28% are fed into a tumbling device simultaneously with a dry glaze composition containing 70% gum arabic, 20% dextrose and 10% milk solids used in the confectionery trade. The mixture is tumbled in the dry state for a period of time sufficient to permit the glaze composition to coat the chocolate chip surface and become impacted thereon by means of the multiple collisions which occur between the particles. In general, it has been found preferable to tumble chocolate chips in such a device in the presence of a glaze composition for about one to three hours. In processing chocolate chips, it has been found to be extremely important to control the temperature of the chocolate chip during processing. The temperature of the product during processing should be sufficiently high at the surface to permit the surface to be sufficiently soft to allow smoothing to take place, but not so high as to allow melting of the surface which retards development of the desired glossy surface. Preferably, the temperature of the chip should be between 50° and 75° F. If temperatures lower than 50° F. are employed, the surface of the chip is too hard and the glaze material does not adhere properly to the chip. If the temperature of the chip is above about 75° F., the chip may be subjected to heat damage characteristic of chocolate, calling blooming.

Typical of the glaze compositions which may be employed are dextrose, corn syrup solids, gum arabic, non-fat milk solids, water soluble gums and like coating compositions.

The time of processing may vary considerably depending upon the type of glaze being employed, the product being coated, and the particle size of the glaze composition. Where a heat sensitive product such as chocolate is processed, it is preferred to cool thhe product during processing in order to dissipate the frictional heat which results. Cooling may be effected by blowing cool air over the product or by employing a jacketed vessel through which a cooling medium is circulated.

The amount of glaze employed can be varied considerably depending upon the thickness of glaze desired but, for all practical purposes, in any one application no more than about 0.5–0.75% glaze by weight of the chip feed should be employed. If larger amounts of glaze are employed, the glaze powder appears to act as a cushion and prevents the requisite collisions of the product particles which are essential in obtaining the desired glaze.

The following examples set forth several embodiments of the present invention:

*Example I*

Commercial chocolate chips having a count of 55 per ounce and a temperature of 62° F. were fed continuously into a rotating cylinder (20 r.p.m.) having a length of 10 feet, a diameter of 30 inches and end baffle having an opening diameter of 13 inches, at a rate of 225 lbs./hour.

Dry glaze (70% spray dried gum arabic, 20% dextrose, 10% non-fat milk solids) was fed simultaneously at 0.5% by weight of the chip feed. The holdup time in the rotating cylinder was 2.5 hours. During the run, cool air at 53° F. and 50% RH was circulated through the tube to remove any excess frictional heat caused by the tumbling chips. The chocolate chip surfaces picked up the dry glaze powder which was worked onto the chip surfaces in a smooth uniform layer by repeated collisions of the particles. Continued tumbling formed a high gloss finish on the coated chips. The chips discharged from the rotating cylinder were ready for packaging.

*Example II*

Forty lbs. of commercial chocolate chips having a count of 55 per ounce and room temperature of 62° F. were placed in a dragée pan having a diameter of 20 inches, and to the chips was added 0.5% of a dry glazed composition containing 70% spray dried gum arabic, 20% dextrose, 10% non-fat milk solids. The dragée pan containing the chips and glaze was rotated at 18 r.p.m. and the chips permitted to tumble in the pan for 3 hours at room temperature in which the pan was located, being maintained at 60° F. during said 3 hour period. The final chip temperature was 64°–65°. The chips at the end of this time had a finely uniform glazed surface.

*Example III*

Freshly deposited commercial chips having a count of 55 per ounce were held at room temperature for 4 hours. The chips were then fed into a rotating cylinder (15 r.p.m.) having a length of 30 feet and a diameter of 36 inches, with an end baffle having an opening of 16 inches in diameter. The chips were fed at a rate of 1000 lbs. per hour. A dry glaze containing 70% spray dried gum arabic, 20% dextrose and 10% non-fat milk solids was fed simultaneously into the rotating cylinder at a rate of 0.6% by weight of the chip feed. The hold-up time in this cylinder was 2.7 hours. Cool air at 41° F. and 40° wet bulb was passed into the cylinder to control the temperature of the chips during tumbling. The chips leaving the desirable end of the cylinder had a uniform glossy glazed coating and were immediately packaged.

While the present invention has been described by means of the foregoing embodiments, it will be appreciated that the invention is not limited thereto; reference being had to the appended claims for definition of the scope of the invention.

What is claimed is:

1. A process for preparing a glazed chocolate product, which comprises supplying to a container individual pieces of chocolate and a dry glaze composition, tumbling the pieces and the glaze composition in a substantially dry state until the surfaces of the pieces soften and particles of the glaze composition adhere thereto while the pieces are substantially maintained as individual pieces unadhered to each other, and continuing to tumble the pieces and the composition until the pieces have acquired a glossy finish.

2. A process as claimed in claim 1, in which the pieces are tumbled at a rate so that their surface temperature is maintained between 50° and 75° F.

3. A process as claimed in claim 1, in which the pieces are tumbled for about 1 to 3 hours.

4. A process as claimed in claim 1, in which the pieces are tempered at about room temperature for about 4 hours prior to tumbling.

5. A process for preparing glazed chocolate chips, which comprises supplying to a container individual chocolate chips and a dry glaze composition, tumbling the chips and the glaze composition in a substantially dry state until the surfaces of the chips soften and particles of the glaze composition adhere thereto while the chips are substantially maintained as individual pieces unadhered to each other, simultaneously with said tumbling removing excess frictional heat by circulating cool air within the container, and continuing to tumble the chips and the composition until the chips have acquired a glossy finish.

6. A process as claimed in claim 5, in which the glaze composition is comprised of gum arabic, non-fat milk solids and dextrose.

References Cited in the file of this patent

UNITED STATES PATENTS

| | | |
|---|---|---|
| 2,434,987 | Burbank et al. | Jan. 27, 1948 |
| 2,851,365 | Perrozzi | Sept. 9, 1958 |

OTHER REFERENCES

"A Course in Confectionery," by Clyne, volumes I and II, November 1955, printed by the Sidney Press Ltd., London and Bedford, pages 194 and 198. TX791C58.